US005615205A

United States Patent [19]

Belser

[11] Patent Number: 5,615,205
[45] Date of Patent: Mar. 25, 1997

[54] BI-LEVEL OPTICAL MEDIA HAVING EMBOSSED HEADER FORMAT

[75] Inventor: Karl Belser, San Jose, Calif.

[73] Assignee: International Business Machines Corporation, Armonk, N.Y.

[21] Appl. No.: 495,866

[22] Filed: Jun. 28, 1995

[51] Int. Cl.$^6$ .................................................. G11B 7/24
[52] U.S. Cl. ............................ 369/275.4; 369/275.3
[58] Field of Search ........................ 369/275.4, 275.3, 369/58, 44.26, 32, 54, 52, 53

[56] References Cited

U.S. PATENT DOCUMENTS

| 4,385,372 | 5/1983 | Drexler1 | 369/275.4 |
|---|---|---|---|
| 4,443,870 | 4/1984 | Hazel et al. | 369/44.26 |
| 4,712,204 | 12/1987 | Takemura et al. | 369/275.3 |
| 4,761,775 | 8/1988 | Murakami | 369/275.3 |
| 4,984,901 | 1/1991 | Maury | 369/44.26 |
| 4,985,881 | 5/1991 | Saito et al. | 369/13 |
| 5,031,166 | 7/1991 | Getreuer et al. | 369/44.26 |
| 5,070,492 | 12/1991 | Ogawa et al. | 369/47 |
| 5,136,564 | 8/1992 | Tobita | 369/44.26 |
| 5,170,385 | 12/1992 | Senshu et al. | 369/275.3 |
| 5,255,261 | 10/1993 | Iida et al. | 369/275.3 |
| 5,305,302 | 4/1994 | Hardwick | 369/275.3 |
| 5,315,567 | 5/1994 | Fuji et al. | 369/13 |
| 5,321,675 | 6/1994 | Ito et al. | 369/32 |
| 5,325,352 | 6/1994 | Matsumoto | 369/275.3 |
| 5,353,277 | 10/1994 | Yasuda et al. | 369/275.4 |
| 5,508,995 | 4/1996 | Moriya et al. | 369/275.4 |

FOREIGN PATENT DOCUMENTS

| 0487321A2 | 5/1992 | European Pat. Off. | G11B 7/007 |
|---|---|---|---|
| 0588305A2 | 3/1994 | European Pat. Off. | G11B 27/30 |
| 2248568 | 5/1975 | France | G11B 7/00 |
| 3620301A1 | 1/1987 | Germany | G11B 7/007 |

OTHER PUBLICATIONS

H. E. Korth, Sectored Servo Headers for Optical Storage Devices, Mar. 1989, vol. 31, No. 10, p. 256.

K. Kobayashi and F. Yamada, New Pre–Formatting for Magneto–Optical Disk Mastering, May 1991, vol. 33, No. 12, p. 442.

Primary Examiner—Tan Dinh
Attorney, Agent, or Firm—Douglas R. Millett; Andrew J. Dillon

[57] ABSTRACT

A bi-level optical storage media is disclosed. The media includes a flat substrate patterned with a regular pattern of lands and grooves, each land and groove having approximately equal widths. Information wobble marks of a first and second type are added to the lands and grooves as deviations in the path of each groove to a first and second side respectively. The deviation distance is by a fixed amount perpendicular to the direction of a groove and identical in magnitude for each wobble mark, and having a short duration length along the direction of a groove. Additionally, groove depths are provided in the grooves. Both the groove depth and the wobble mark deflection distances are chosen to give a usable reflectivity signal from the wobble marks when sensed during playback. Additionally, encodings using the first and second wobble mark types are provided that designate the physical location of a length of groove or land as distinguished from other length of grooves or lands. The wobble marks are present or absent at wobble mark positions, these wobble positions being aligned perpendicular to the direction of the grooves on each groove for all grooves in a group of grooves. The wobble mark or no wobble mark usage at each wobble mark position is encoded such that adjacent grooves are not deflected toward one another. Lastly the first and second type wobble mark usage is balanced as to duration length in each deflection side over a short length along the direction of any groove. These balanced deflections keep the push/pull position error signal from being biased into indicating an erroneous center position perpendicular to the groove direction.

17 Claims, 8 Drawing Sheets

FIRST CODE WORD FOR ALL CODES

DUAL SPOT MASTERING WITH ACOUSTIC OPTICAL DEFLECTION OF +/- 1/2 TRACK

```
xxxxx|xxxxxxx|xxxxxx\    /x|x\
xxxxx|xxxxxxx|xxxxxxx\  /xxxxx|xxxxx\
                    \x|x/|xxxxx|xxxxx|xxx\   00011 = 0
                    /x|x\|xxxxx|xxxxx|xxx/
xxxxx|xxxxxxx|xxxxxxx/  \xxxxx|xxxxx/         00011 = 0
xxxxx|xxxxxxx|xxxxxx/    \x|x/
                                              00011 = 0
```
Fig. 6A

```
xxxxx|xxxxxxx|xxxxxx\    /x|x\
xxxxx|xxxxxxx|xxxxxxx\  /xxxxx|xxxxx\
                    \x|x/|xxxxx|xxxxx|xxx\   00101 = 1
                    /x|x\|xxxxx|xxxxx|xxx/
xxxxx|xxxxxxx|xxxxxxx/  \xxxxx|xxxxx/         00101 = 1
xxxxx|xxxxxxx|xxxxxx/    \x|x/
                                              00101 = 1
```
Fig. 6B

```
              /x|x\
xxxxx|xxxxxxxx|xxxxxxx|xxxxxx\    /xxxxx|xxxxx\
xxxxx|xxxxxxxx|xxxxxxx|xxxxxxx\  /xxxxxx|xxxxxx\     00110 = 2
                             \x|x/
                             /x|x\                    00110 = 2
xxxxx|xxxxxxxx|xxxxxxx|xxxxxxx/  \xxxxxx|xxxxxx/
xxxxx|xxxxxxxx|xxxxxxx|xxxxxx/    \xxxxx|xxxxx/      00110 = 2
              \x|x/
```
Fig. 6C

```
xxxxx|xxxxx\       /xxxxx|xxxxxxx|xxxxxxxx|xxxxx\       /xxx
xxxxx|xxxxxxx|xxxxxxx|xxxxxxx|xxxxxx|xxxxxxxx|xxxxx|xxxxxx   01001 = 3
                   \x|x/
xxxxx|xxxxx\       /xxxxx|xxxxxxx|xxxxxxxx|xxxxx\       /xxx
xxxxx|xxxxxxx|xxxxxxx|xxxxxxx|xxxxxx|xxxxxxxx|xxxxx|xxxxxx   01001 = 3
                   \x|x/
                                                             01001 = 3
```

Fig. 6D

```
xxxxx|xxxxx\       /xxxxx|xxxxxxx|xxxxxxxx|xxxxx|xxxxx
xxxxx|xxxxxxx|xxxxxxx|xxxxxxx|xxxxxx|xxxxxxxx|xxxxx/     \xxxxx   01010 = 4
                   \x|x/
xxxxx|xxxxx\       /xxxxx|xxxxxxx|xxxxxxxx|xxxxx|xxxxx
xxxxx|xxxxxxx|xxxxxxx|xxxxxxx|xxxxxx|xxxxxxxx|xxxxx/     \xxxxx   01010 = 4
                   \x|x/
                                                                  01010 = 4
```

Fig. 6E

```
xxxxx|xxxxx\       /xxxxx|xxxxxxx|xxxxxxxx|xxxxx|xxxxx
xxxxx|xxxxxxx|xxxxxxx|xxxxxxx|xxxxxx|xxxxxxxx|xxxxx|xxxxxx   01100 = 5
                   \x|x/
xxxxx|xxxxx\       /xxxxx|xxxxxxx|xxxxxxxx|xxxxx|xxxxx
xxxxx|xxxxxxx|xxxxxxx|xxxxxxx|xxxxxx|xxxxxxxx|xxxxx|xxxxxx   01100 = 5
                   \x|x/
                                                             01100 = 5
```

Fig. 6F

```
xxx\  /xxxxx|xxxxxxxx|xxxxxxxx|xxxxxx
xxxxxx|xxxxxxx|xxxxxxxx|xxxxxx|xxxxxx    10100 = 8
      \xxxxx/ |x|x| \xxxxx/
xxx\  /xxxxx|xxxxxxxx|xxxxxxxx|xxxxxx
xxxxxx|xxxxxxx|xxxxxxxx|xxxxxx|xxxxxx    10100 = 8
      \xxxxx/ |x|x| \xxxxx/
              /x|x\
              \xxxxx|xxxxxxxx|xxxxxxxx|xxxxxx
                                              10100 = 8
                    |xxxxxx|xxxxxx
```

Fig. 6I

```
xxx\  /xxxxx|xxxxxxxx|xxxxxxxx|xxxxxx
xxxxxx|xxxxxxx|xxxxxxxx|xxxxxx|xxxxxx    11000 = 9
      \xxxxx/ |x|x| \xxxxx/
xxx\  /xxxxx|xxxxxxxx|xxxxxxxx|xxxxxx
xxxxxx|xxxxxxx|xxxxxxxx|xxxxxx|xxxxxx    11000 = 9
      \xxxxx/ |x|x| \xxxxx/
              /x|x\
              \xxxxx|xxxxxxxx|xxxxxxxx|xxxxxx
                                              11000 = 9
                    |xxxxxx|xxxxxx
```

Fig. 6J

```
XXXXX|XXXXXXX|XXXXX/        \XXXXX|XXXXXXX|XXXXX         10100 = 8
      \X|X/                                                1
                                            /X|X\         10001 = 9
XXXXX|XXXXXXX|XXXXXXX|XXXXX\     /XXXXX|XXXXX              1
XXXXX|XXXXXXX|XXXXXXX|XXXXXXX|XXXXX/    \XXX              00011 = 0
                        \X|X/                              1
                /X|X\                                     00110 = 1
XXXXX|XXXXXXX|XXXXXXX|XXXXXXX|XXXXX\     /XXX              1
XXXXX|XXXXXXX|XXXXX/     \XXXXX|XXXXXXX|XXXXX             00101 = 2
                            \X|X/                          1
           /X|X\                                          01001 = 3
XXXXX|XXXXXXX|XXXXXXX|XXXXX\     /XXXXX|XXXXX              1
XXXXX|XXXXX/     \XXXXX|XXXXXXX|XXXXXXX|XXXXX             01010 = 4
                     \X|X/                                 1
  /X|X\                                                   10010 = 5
XXXXX|XXXXXX       /XXXXX|XXXXXXX|XXXXXXX|XXXXX            1
XXX/     \XXXXX|XXXXXXX|XXXXXXX|XXXXXXX|XXXXX             11000 = 6
            X|X/                                           1
               /X|X\                                      01100 = 7
XXX\     /XXXXX|XXXXXXX|XXXXXXX|XXXXXXX|XXXXX              1
XXXXX|XXXXXXX|XXXXX/     \XXXXX|XXXXXXX|XXXXX             10100 = 8
      \X|X/                                                1
                                 /X|X\                    10001 = 9
XXXXX|XXXXXXX|XXXXXXX|XXXXX\     /XXXXX|XXXXX              1
```

*Fig. 7*

FIRST CODE WORD FOR ALL CODES

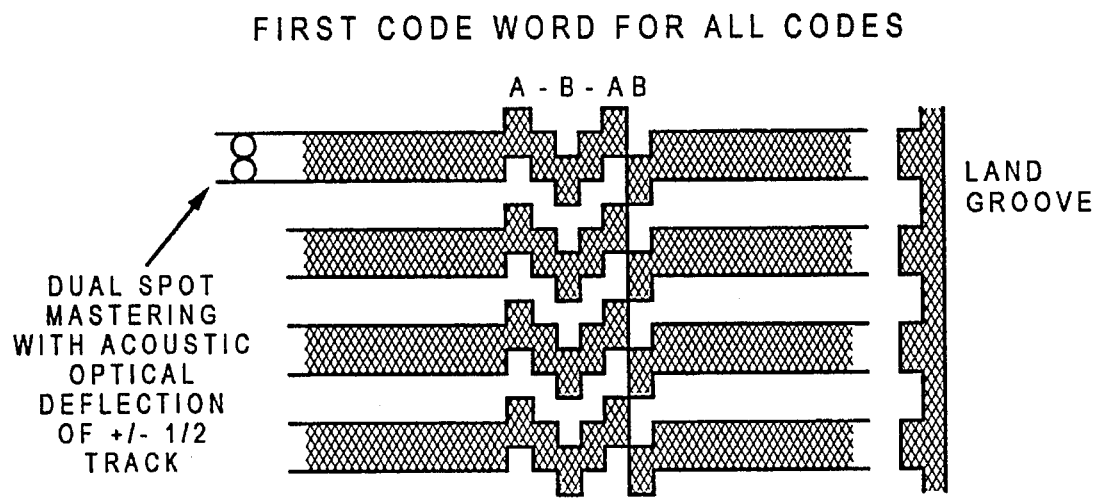

*Fig. 8*

BI-LEVEL OPTICAL MEDIA HAVING EMBOSSED HEADER FORMAT

BACKGROUND OF THE INVENTION

1 Technical Field

The present invention relates in general to a mass memory optical disk data storage system for use in a data processing system and, more particularly, to a method of formatting embossed header patterns on the optical disk. More particularly still, the present invention relates to providing embossed header format on bi-level optical media to reduce adjacent track crosstalk during a header play back operation of the optical disk.

2. Description of the Related Art

One type of optical disk drives, such as those using either ISO standard 130 mm rewritable or write once, read many (CD-WORM) optical disks, uses a push/pull tracking method. These optical disk types have guide grooves or so-called pre-grooves formed previously along with the formation of sector header information on the disk. These grooves are irradiated with a spot of coherent light to sense the center position of either the grooves or the land between grooves. The unbalance of the distribution of the reflection of light diffracted from the pre-grooves is used to generate the track position error signal. The track position error signal is fed back to a servo system to control the spot to follow either the center of the grooves or the center of the land between grooves. This method for generating the position error signal is often called the push/pull tracking method.

To increase the storage capability of optical disks, the recorded area on the disk has been expanded to include bi-level optical media. Bi-level optical media is media that has equal land and groove spacing such that data can be recorded on both the lands and the grooves, which allows greater track density on the optical media for a given laser wave length using the push pull tracking method.

With this increased track density, the track pitch becomes narrow relative to the read spot size generated by the laser beam and laser optics. This narrow track pitch leads to significant adjacent track signal interference for both the read only header and read/write user information. There are several possible methods for canceling the adjacent track interference for the read/write user information on the disk. For example bi-level media can be designed to cancel the adjacent track interference of magnetically or reflectivity change marks by adjusting the depth of the groove of the biplanar media. Magnetic super resolution is another method that can be used to mask the adjacent track interference for magnetically recorded marks. However none of these methods helps to cancel the adjacent track interference for the read only header part of the media format because this information is formed by embossed features rather that by magnetic or reflectivity change marks.

Because of this limitation, the master written header for the narrow track pitch bi-level media substrate must be encoded and read in such a way that the sector header information can be reliably read by a single read spot in the presence of significant adjacent track interference.

SUMMARY OF THE INVENTION

It is therefore one object of the present invention to provide a mass memory optical disk data storage for use in a data processing system.

It is another object of the present invention to provide a method of formatting embossed header patterns on the optical disk.

It is yet another object of the present invention to provide embossed header format on bi-level optical media to reduce adjacent track cross talk during a play back operation of the optical disk.

The foregoing objects are achieved as is now described. According to the present invention, a new form of bi-level optical data storage media is disclosed. The media includes a flat substrate patterned with a regular periodic pattern of lands and grooves, each land and groove having approximately equal widths. Information wobble marks are added to the lands and grooves as deviations in a path of grooves to a first or second side. The deviation is by a fixed amount identical in magnitude for each wobble mark and having a short duration along the direction of the grooves. Additionally, grooved depths are provided in the grooves as are wobble mark deflection distances being placed along side the grooves. Both the groove depths and the wobble mark deflection distances are chosen to give useable reflectivity signal amplitude from the wobble marks during playback. They also are chosen to give a sufficient position error signal when the diffraction light distribution reflected from the grooves during playback is sensed by a conventional push/pull position error sensing system. Additionally, first and second wobble mark encodings are provided that designate a physical location of a length of groove or land as distinguished from other lengths of grooves or lands. These are placed at wobble positions with or without a wobble mark, these wobble positions being aligned perpendicular to the direction of the grooves on each grooves and for all grooves in a group of grooves. Furthermore, said wobble mark encodings are provided such that the deflections of any deviation during playback to an adjacent groove do not simultaneously move toward each other. Lastly, the media further includes a plurality of first and second wobble mark deflections extending over a short length of a groove. These deflections are balanced in number and duration to prevent a push/pull position error signal from being biased into indicating an erroneous center position perpendicular to the groove direction for a given average.

The grooves may be circular, spiral, or straight lines and the substrate may be either a disc or rectangular. The substrate may also be coated with a magnetic super resolution magneto optical recording film to reduce adjacent track interference for the magnetic recording. The groove depths may be determined primarily by the minimization of adjacent track interference of reflectivity marks from a phase change recording film. The groove depth may also be determined to reduce adjacent track interference from marks on an ablative write-once film, or from a magneto optical recording film.

Typically, the wobble mark information is encoded by the presence (1) or absence (0) of the read-back signal change in amplitude with variable length and at specific locations on the media. Wobble marks may be detected asynchronously as would be required to find the exact start of an encoding field. Wobble mark encoding may be used with a synchronous detection channel for decoding the sector and/or track address information. The encoding may use an N out of M code in which M is greater than N and the read-back detection is done by picking the code word that corresponds to the N largest amplitude signals at the read-back wobble mark center positions for each code word. Alternatively, the wobble mark information may be encoded by the center position of the read-back signal from individual wobble marks relative to one another. Further still, the wobble mark information may be encoded by leading and trailing edges of the read-back signal from the wobble marks relative to one another.

The wobble mark encoding may use a synchronous detection channel for decoding the sector or track address information or both within a wobble mark pattern. The wobble mark pattern typically includes a radially aligned wobble mark tone pattern for phase synchronizing a data channel clock to be aligned with the subsequent data wobble marks positions. The wobble mark pattern further includes an address mark feature for determining which channel clock cycle is at the first bit position of the wobble mark data and a sequence of synchronously decoded wobble marks that determine a unique sector address on the media. Redundant wobble mark encodings can be used to allow reliable sector address determination in the presence of media defects.

Finally, the land and groove widths typically are approximately a laser full width half maximum diameter for a laser spot used during playback to sense the features on the substrate of the media.

A method for mastering the optical data storage media for low noise is also disclosed. The method includes applying a uniform thickness of photo resist on a master substrate. Next, the method exposes the photo resist to define grooves and wobble mark locations using two or more side by side diffraction limited, focused laser spots. These laser spots are aligned so that lines between all spot centers are perpendicular to the direction that the grooves are to be formed. Then, the photo resist is exposed so as to reach the master substrate so that a steep light intensity gradient from the laser spots defines the edges of the grooves. Next, the exposed photo resist is developed such that a top surface land is defined by the under-exposed surface of the photo resist such that a bottom surface of the groove is defined by the master substrate and such that wall edges are steep and as smooth as possible. Finally, the master photo resist topology is replicated to form a substrate for the mass production of the optical media.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts an embossed tone pattern that is sensed by the system in FIGS. 1 and 2 to indicate the start of an encoding field and to produce a constant frequency data detection clock signal.

FIG. 5 depicts a five tone cycle length of bi-level media that in conjunction with the tone pattern in FIG. 4 constitutes an address mark, which allows the system in FIG. 2 to align it counters relative to the embossed track address and sector address features that follow the address mark.

FIGS. 6A–6J show radially aligned 2-out-of-5 encoding for sector address digits 0 to 9 such that 1) each code digit will all have the same number of opposite polarity wobbles and 2) such that the code never results in a decrease of detected signal for the desired pattern due to adjacent track interference because the pattern is the same on every groove and aligned perpendicular to the grooves.

FIG. 7 shows radially aligned 2-out-of-5 encoding for track address digits 0 to 9 such that 1) each code digit and the normal sequential transitions between code digits (including 9 to 0) all have the same number of opposite polarity wobbles and 2) such that the change in code at the transitions never results in a decrease of detected signal for the desired pattern due to adjacent track interference.

FIG. 8 shows an example of bi-level media being mastered using a pair of side-by-side small diameter spots that allows for 1) the definition of sharp edges to the grooves due to steep intensity gradients at the groove edge and 2) the high resolution wobbling of the spot pair to encode accurately the wobble marks at a high wobble density in order to make the header as short as possible.

DETAILED DESCRIPTION OF THE PREFERRED EMBODIMENT

1. Detecting the Header

Figure 1:
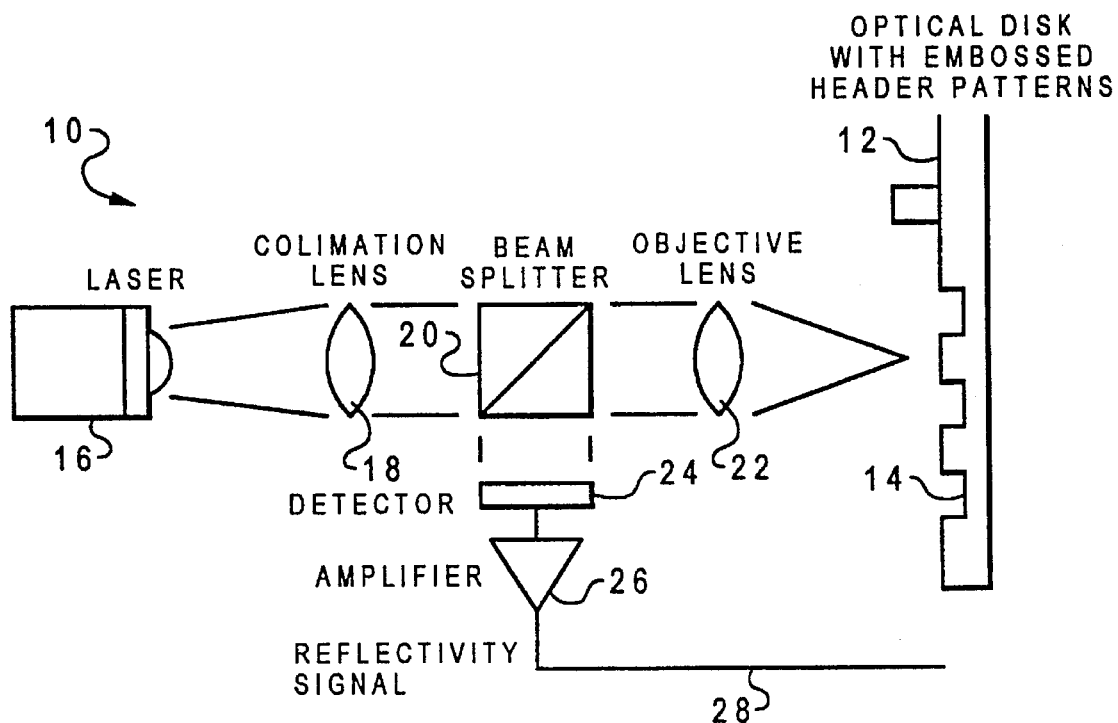
FIG. 1 depicts in accordance with a preferred embodiment of the present invention a schematic implementation of an optical system and associated photo diode and preamplifier electronics that can be used to sense the embossed header features that are part of the invention.

FIG. 1 is a schematic diagram representing an optical system for recording and reproducing information on and from an optical disk 12. Optical system 10 includes a semi-conductor laser 16, which transmits a laser beam through collimation lens 18 and through beam splitter 20. Beam splitter 20 separates the light so that a portion continues towards optical disk 12, and the remaining portion proceeds to the detector portion of optical system 10. The light portion projected towards optical disk 12 passes through objective lens where it is focused to a point sharp enough to reflect off the surface of optical disk 12 and be retransmitted through the objective lens and reflected off a mirror within the beam splitter 20 to detector 24. Detector 24 and amplifier 26, which is coupled to detector 24, processed the light received from the laser and reflected from optical disk 12 and converted to an electrical signal on line 28.

The reflectivity signal on line 28 only contains a non-constant waveform where there is header information. The header information consists of four parts, a sync field, that is a tone, a constant field, that, in conjunction with the end of the sync field, gives an exact location of the start of the header, a decimal encoded sector address, and a decimal encoded track address.

Figure 2:
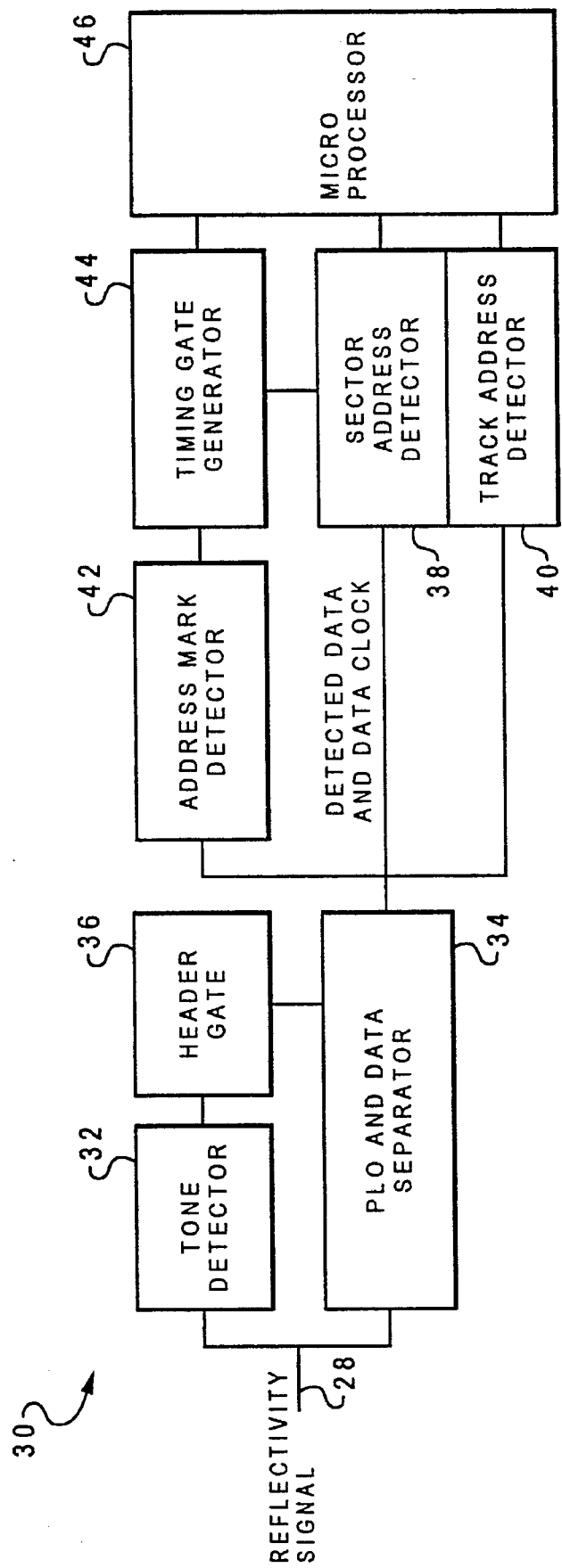
FIG. 2 is a schematic representation of the functions that have to be performed to decoded the sequences of embossed header features that are part of the invention.
Figure 6G:
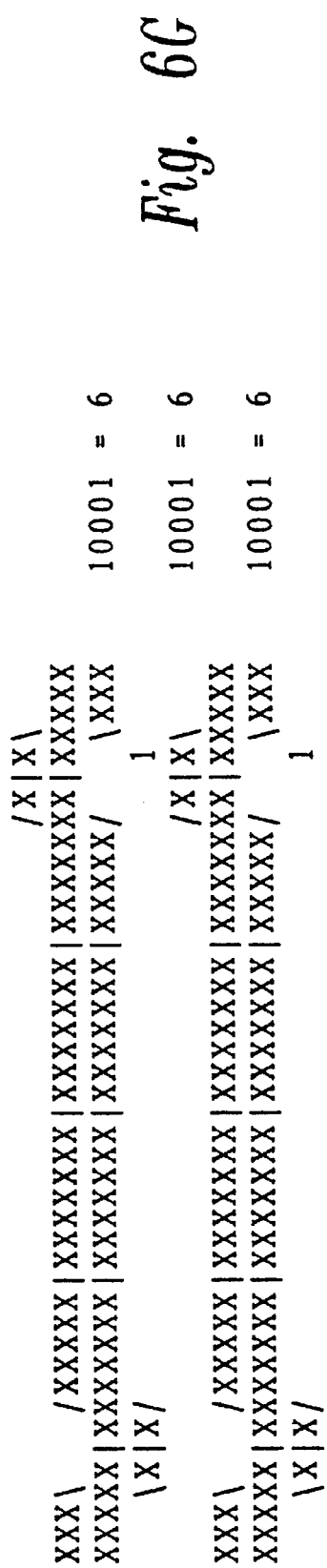
Figure 6H:
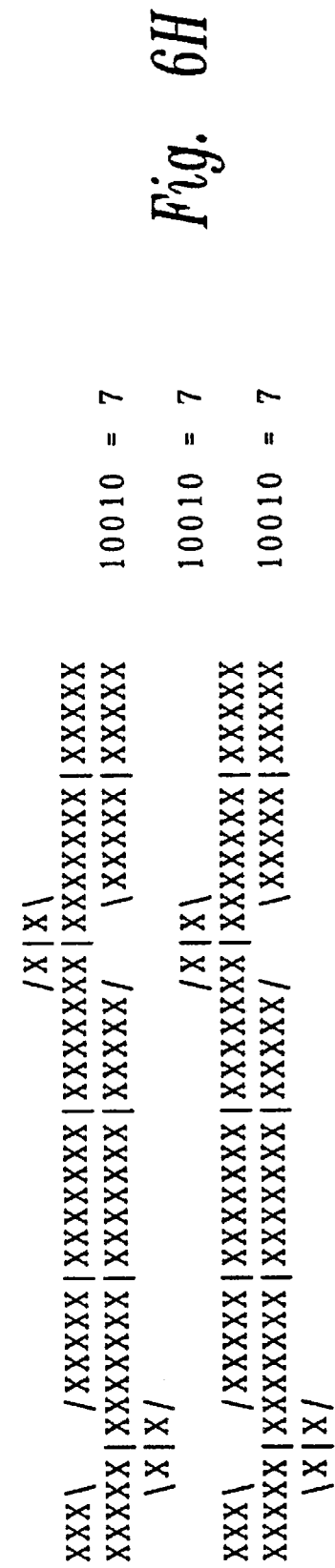

The reflectivity signal on line 28 goes to signal decoder 30 illustrated in the block diagram of FIG. 2. The purpose of the signal decoded is to recover the sector and track address and send the addresses to the microprocessor 46.

Specifically the reflectivity signal on line 28 is split and fed to the tone detector 32 and the phase locked oscillator (PLO) and data separator 34. The tone detector 32 senses the presence of a unique embossed tone pattern from the disk, which signals the start of a header to the header gate generator 36. The header gate generator generates a pulse that has a duration equal to the nominal length of the header information.

This header gate pulse from the header gate generator 36 controls the PL 0 and data separator 32 to start processing data from the reflectivity signal on line 28. The PL 0 generates a detection clock that is in phase lock with the tone in the sync field, which is the very first part of the header.

The data separator uses the detection clockfrom the PLO to decode the 1's and 0's data from the reflectivity signal on line 28. The data separator does this by looking to see if the reflectivity signal is bigger than a threshold value at the time of the detection clock positive transition. The data separator outputs detected data at the positive detection clock transitions of a 0 bit if the value is below the threshold level and a 1 bit otherwise. The detected data is in synchronism with the detection clock for later decoding.

The detection clock and detected data then proceeds to the address mark detector 42, which determines the start of the encoded sector and track data, to the sector address detector 38, which determines which sector address is currently being read, and to the track address detector 40, which determines which track is currently being read. The address mark detector 42 starts the timing gate generator 44, which selects which detected data bits are sector and which detected data bits are track information. Finally the decoded digits from the sector address detector 38 and track address detector 40 are sent to microprocessor 46, which processes the signal and provides appropriate output to the user through an appropriate devise.

Figure 3:
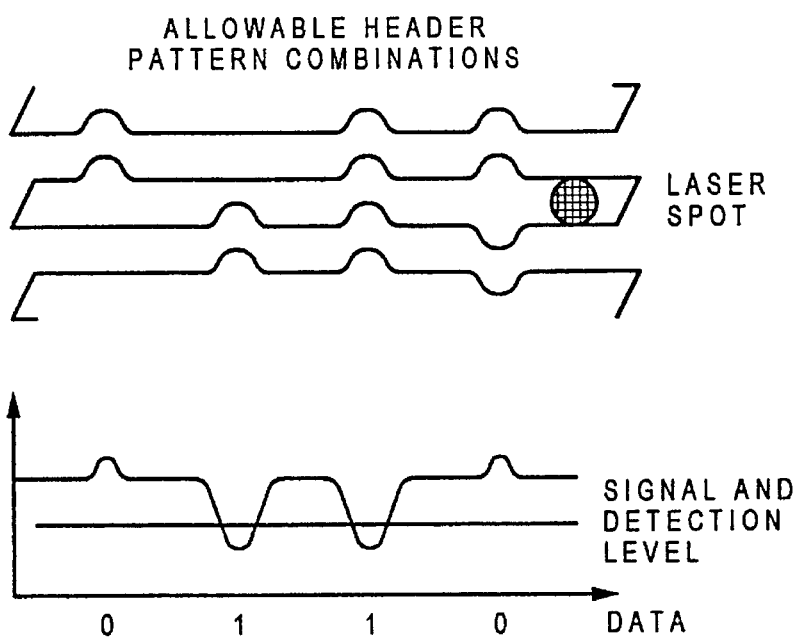
FIG. 3 depicts the embossed feature types and waveforms that arise from the electronic sensing of the reflected light from the features of FIG. 2.

FIG. 3 illustrates the allowable header mark combinations as found on optical media 12 and as represented by the embossed header patterns 14. FIG. 3 also shows the electrical signals that result from these patterns. Specifically FIG. 3 illustrates a bi-level media having equal land and groove spacing with all allowable combinations of groove wobble in the direction perpendicular to the grooves. Note that in this drawing it is assumed that the grooves are mastered in the master writing process, although the lands could be mastered using another mastering process. FIG. 3 illustrates a sample signal and detection level corresponding to the data stored in the wobble deflections in the track as followed by the laser spot in 2. Master Writing the Header In a preferred embodiment the mastering on bi-level media meets the following requirements. Firstly, both the land and groove portion of the optical media should be as flat as possible to minimize any spurious surface noise. Secondly, the sector (or track plus sector number per track) position information should be encoded in the mastering process, such that it can be read when the read spot is positioned on either the lands and the grooves. Lastly, the mastered header data should not distort or bias the push pull position error signal so that it shifts the sensed track center erroneously toward an adjacent track.

The mastering of grooves is done by spinning a uniform photo resist onto a master substrate. The photo resist is then heavily exposed to produce spiral grooves by simultaneous rotation and translation of an illumination pattern from a light source such as, for example, a laser. The exposed photo resist is then developed down to the substrate. Both the top of the photo resist and the substrate can be made very flat and hence will generate little noise. Only the walls between the lands and the grooves will cause noise because they are subject to changes in photo resist exposure sensitivity and intensity variations of the exposing spot of light. The groove edges can be made less dependent to these photo resist and light level variations by making the gradient of light as a function of distance perpendicular to the grooves very large.

The gradient is determined by the theoretically diffraction limited intensity distribution (Airy's spot ) for a given exposure width. Hence, if a single exposure spot is used to expose the groove in the bi-level media master, then one is not free to make the intensity gradient steeper. The result of a poorly defined groove edge "groove noise." This problem can be alleviated by exposing the media with two or more radially adjacent smaller diameter spots as shown in FIG. 8.

The molds used to fabricate the actual media substrates are replicated from this master substrate topology. The principles of mastering the land and grooves of an optical media are well known to those skilled in the art and do not represent any advances put forward by this invention.

The wobble track method is used to encode information in each sector header. The illumination pattern is deflected radially while mastering grooves using an acousto-optical modulator to make a wobble mark. Light modulation may be used in conjunction with the deflection to control the shape of the wobble marks. The wobble track method has the characteristic that it simultaneously places a land in the grooves relative to the nominal groove center while putting a groove in the land relative to the nominal land center. The result is that the wobbled track information can be sensed when tracking on either the lands or the grooves in bi-level media.

There are two basic variables in the design of the bi-level media, the groove depth and the distance of the wobble relative to the track center. The groove depth must be chosen from the range of depths that give reliable generation of the push pull position error signal. The groove depths must also be chosen from the range of depths that give acceptable cancellation of the adjacent track cross talk signal for the user data. The amount of wobble of the land into groove or the groove into land can be adjusted to give an adequate wobble detection signal, ie. to give a large reduction of reflected light where the wobble occurs.

The wobble marks in the preferred embodiment are used as a type of pulse position modulation (PPM), but is not limited to this method. For PPM data encoding, the center of the read back pulse in time relative to other like pulses is the information that is recorded on the media. In this case the centers of the marks are used to keep a clock synchronized to the encoded data and the data is detected synchronously. A wobble is a "1" and no-wobble is a "0" as shown in FIG. 3B.

The encoding of the wobble bits uses three conditions: The first is track deflection toward the outer diameter (OD), track deflection towards the inner diameter (ID), and no deflection. The track wobble is sensed using a reflectivity detection channel as shown in FIG. 1. Thus, it is NOT possible to distinguish between the ID and the OD deflection direction of the wobble. The wobble direction, since the detection channel cannot discriminate between ID and OD wobbles, can be used to insure that the push pull position error signal is balanced on average.

Preferably, the number and duration of the OD direction and ID direction wobbles should average to zero over about a few microseconds so that the servo signal is not disturbed on the average.

3. Encoding the Header Information

In the preferred embodiment the encoding of the header information on bi-level media meets the following requirements. Firstly, the code words using ID and 0D wobbles should average to zero so that there is no push pull position error signal corruption. Secondly, the header encoding should accurately identify the location in time (or space) of the start of the sector. Thirdly, the header encoding should uniquely identify each sector relative to all other sectors. Fourthly, the header encoding should minimize the amount of mark to mark adjacent track interference by the type and placement of each mark reactive to the marks on an adjacent track. Lastly, the encoding should be capable of having redundancy so that adequately reliable decoding can be done in the presence of media defects and noise.

The sector header for the preferred embodiment is similar in structure to the header in a conventional 130 mm ISO standard rewritable optical media. It is as follows:

| Data:          | Sync | AM | S | S | T | T | T | T | S | S | T | T | T | T | S | S | T | T | T | T |
|----------------|------|----|---|---|---|---|---|---|---|---|---|---|---|---|---|---|---|---|---|---|
| PLO Clock Bits:| 40   | 5  | 5 | 5 | 5 | 5 | 5 | 5 | 5 | 5 | 5 | 5 | 5 | 5 | 5 | 5 | 5 | 5 | 5 | 5 | where Sync, AM, S and T are a 40 clock period synchronization mark, a 5 clock period address mark, a 5 clock period sector address digit as part of a multi-digit number, and a 5 clock period track address digit as part of a multi-digit number respectively.

A track is defined to be one revolution of the disk so that only the track address changes from one adjacent track to another. The sector number will be the same in each radially aligned row, and as such will not experience much adjacent track interference because there is not pattern change radially. The track address number will also be radially aligned, but will change encoding from track to track. Thus the track address digit encoding will have to be done so as to minimize the effects of adjacent track interference. Separation of the sector location address into the track and sector per track addresses allows the sector per track address to be more efficiently coded as compared to the track address part. This separation is optional for the functionality of the preferred embodiment.

Figures 4, 5:
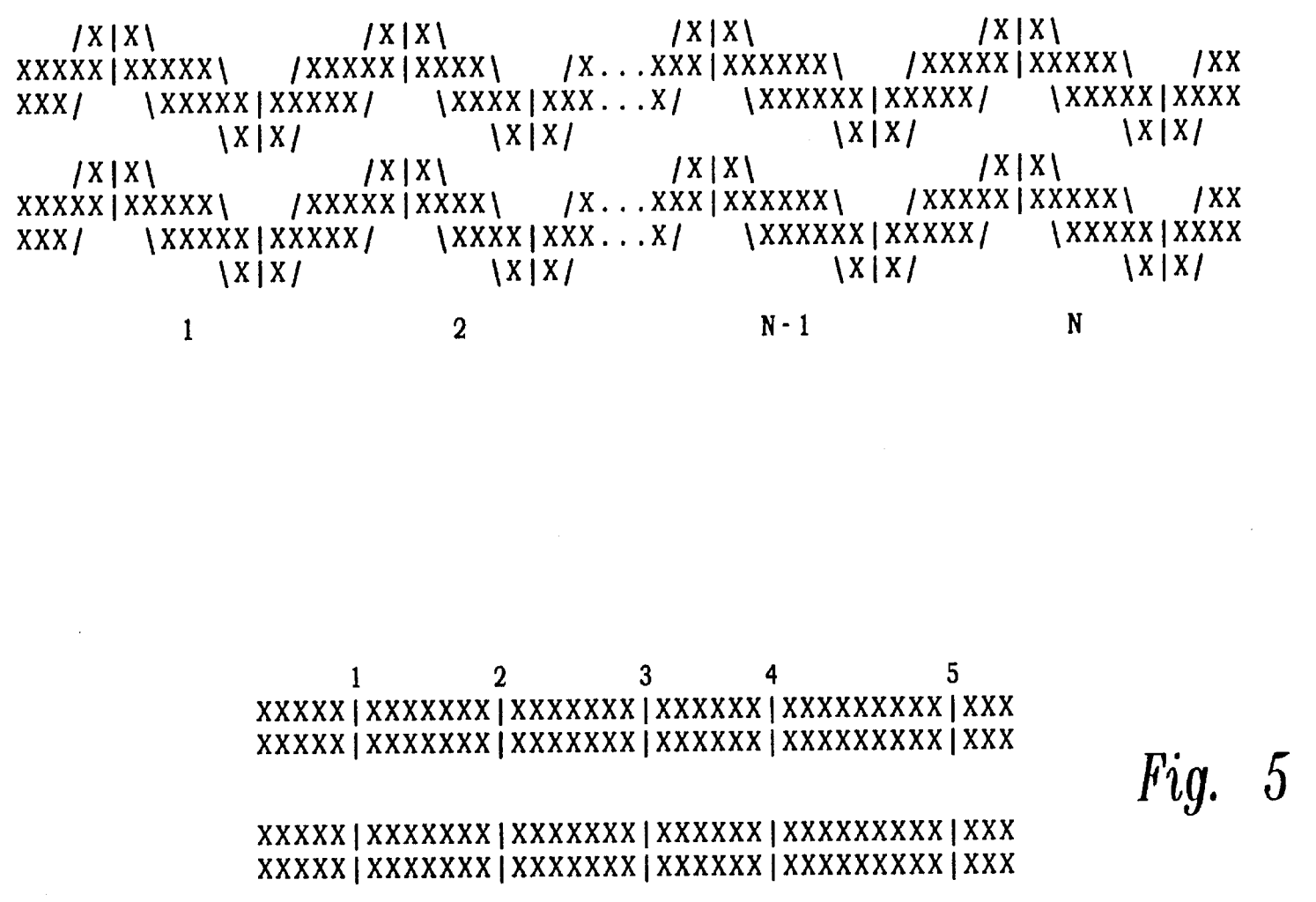

The sector and track addresses are encoded in triplicate and decoded by majority voting to achieve the required reliability with respect to defects. If the failure rate of an SSTTTT address is P, then the failure rate of the triple redundancy pattern is P squared. Interestingly, both the leading and trailing edges of the Sync field, a constant-to-tone and a tone-to-constant signal, can be used to generate the start of sector timing. In effect, there is double redundancy in the address mark. The synchronization field (Sync)in this system is N ID and NOD deflections as shown in FIG. 4, which is a schematic representation of a sync encoding. This pattern is used by the tone detector to detect the start of the header, and by the phase locked oscillator (PLO) to generation of a phase locked detection clock, according to the present invention. In this case, N is chosen to be 40 so as to allow adequate time for the header to be sensed and the PLO to lockup. Notice that there is no adjacent track interference in the sync field because all of the information from track to track is the same.

The address mark (AM) consists of five consecutive detection clock periods with no wobble marks, as shown in FIG. 5, which is a schematic illustration of an AM encoding for the bi-level media header. The AM is used to allow detection of the trailing edge of the Sync field for the purpose of determining the start of the sector. Notice that there is no adjacent track interference in the AM field because all of the information from track to track is the same.

The sector number information is encoded in decimal digits. Each digit uses five consecutive header code bits, which are shown in FIGS. 6A–6J. FIGS. 6A–6J are schematic diagrams of sector number encoding for the bi-level media header for codes 0 to 9, respectively. Further, the format requires that a track be one complete revolution and that the sector header information be radially aligned from track to track. Notice that there is no adjacent track interference in the sector address field because all of the information from track to track is the same.

The sector number code is a two out of five code. It is intended that maximum likelihood detection be used to detect the code words. Maximum likelihood detection can be implemented by sampling the signal amplitude at the header clock positions and calling 1's the 2 out of 5 amplitudes that have the largest values. Maximum likelihood detection minimizes the effects of any residual adjacent track interference. The encoding of the SS digits allows each digit to have one of ten different values, thus the number of sectors that can be encoded is 10*10=100, which is sufficient to encode sectors in one revolution of a disk. Table 1 illustrates the way the sector decimal digit code would appear.

TABLE 1

MULTIPLE DIGIT SECTOR NUMBER ENCODING OF SECTOR M + N

| M: | +00 | | +10 | | +20 | | +30 | | +40 | | +50 | | etc. |
|----|-----|---|-----|---|-----|---|-----|---|-----|---|-----|---|------|
|    | S   | S | S   | S | S   | S | S   | S | S   | S | S   | S |      |
| N: |     |   |     |   |     |   |     |   |     |   |     |   |      |
| 0  | 0   | 0 | 1   | 0 | 2   | 0 | 3   | 0 | 4   | 0 | 5   | 0 |      |
| 1  | 0   | 1 | 1   | 1 | 2   | 1 | 3   | 1 | 4   | 1 | 5   | 1 |      |
| 2  | 0   | 2 | 1   | 2 | 2   | 2 | 3   | 2 | 4   | 2 | 5   | 2 |      |
| 3  | 0   | 3 | 1   | 3 | 2   | 3 | 3   | 3 | 4   | 3 | 5   | 3 |      |
| 4  | 0   | 4 | 1   | 4 | 2   | 4 | 3   | 4 | 4   | 4 | 5   | 4 |      |
| 5  | 0   | 5 | 1   | 5 | 2   | 5 | 3   | 5 | 4   | 5 | 5   | 5 |      |
| 6  | 0   | 6 | 1   | 6 | 2   | 6 | 3   | 6 | 4   | 6 | 5   | 6 |      |
| 7  | 0   | 7 | 1   | 7 | 2   | 7 | 3   | 7 | 4   | 7 | 5   | 7 |      |
| 8  | 0   | 8 | 1   | 8 | 2   | 8 | 3   | 8 | 4   | 8 | 5   | 8 |      |
| 9  | 0   | 9 | 1   | 9 | 2   | 9 | 3   | 9 | 4   | 9 | 5   | 9 |      |

The track number information is encoded in decimal digits. Each digit uses 5 consecutive header code bits as shown in FIG. 7, which is a schematic diagram of the track number encoding for the bi-level media header for codes 0 to 9. The format requires that a track be one complete revolution and that the track header information be radially aligned from track to track. Notice that there is adjacent track interference in the track address field because all of the information from track to track is different.

The track number code is also a two out of five code. Again, it is intended that maximum likelihood detection be used to detect the code words. Additionally, the adjacent track signal adds constructively with the desired signal, i.e. 0's get lower and 1's get higher in amplitude. Accordingly, this leads to no loss of signal-to-noise ratio because of adjacent track interference.

The encoding of the second, third and fourth digits of the TTTT encoding allows each of these positions to have effectively 5 values, not 10. Thus, the number of tracks that can be encoded are 5*5*5*10=1250, which is sufficient to encode all of the tracks in a typical band of zone recorded media. Table II illustrates the way the track decimal digit code would appear.

positions with or without a wobble mark, said wobble positions being aligned perpendicular to the direction of said grooves on each groove and for all grooves in a group of grooves;

second wobble mark encodings opposite said first wobble mark encodings such that the deflection of a sensing system to an adjacent groove do not simultaneously move toward each other; and a plurality of first and second wobble deflections extending over a short length of a groove such that a push/pull position error signal is not biased into indicating an erroneous center position perpendicular to said groove direction for a given average.

2. The media according to claim 1, in which the grooves are circular and the substrate is a disk.

3. The media according to claim 1, in which the grooves are spiral and the substrate is a disk.

4. The media according to claim 1, in which the grooves are straight lines and the substrate is rectangular.

TABLE II

MULTIPLE DIGIT TRACK NUMBER ENCODING OF SECTOR M + N

| M: | +00 | | | | +10 | | | | +20 | | | | +30 | | | | +40 | | | | +50 | | | | ... etc. |
|---|---|---|---|---|---|---|---|---|---|---|---|---|---|---|---|---|---|---|---|---|---|---|---|---|---|
| | T | T | T | T | T | T | T | T | T | T | T | T | T | T | T | T | T | T | T | T | T | T | T | T | |
| N: | | | | | | | | | | | | | | | | | | | | | | | | | |
| 0 | 0 | 0 | 0 | 0 | 0 | 0 | 2 | 0 | 0 | 0 | 4 | 0 | 0 | 0 | 6 | 0 | 0 | 0 | 8 | 0 | 0 | 2 | 0 | 0 | |
| 1 | 0 | 0 | 0 | 1 | 0 | 0 | 2 | 1 | 0 | 0 | 4 | 1 | 0 | 0 | 6 | 1 | 0 | 0 | 8 | 1 | 0 | 2 | 0 | 1 | |
| 2 | 0 | 0 | 0 | 2 | 0 | 0 | 2 | 2 | 0 | 0 | 4 | 2 | 0 | 0 | 6 | 2 | 0 | 0 | 8 | 2 | 0 | 2 | 0 | 2 | |
| 3 | 0 | 0 | 0 | 3 | 0 | 0 | 2 | 3 | 0 | 0 | 4 | 3 | 0 | 0 | 6 | 3 | 0 | 0 | 8 | 3 | 0 | 2 | 0 | 3 | |
| 4 | 0 | 0 | 0 | 4 | 0 | 0 | 2 | 4 | 0 | 0 | 4 | 4 | 0 | 0 | 6 | 4 | 0 | 0 | 8 | 4 | 0 | 2 | 0 | 4 | |
| 5 | 0 | 0 | 0 | 5 | 0 | 0 | 2 | 5 | 0 | 0 | 4 | 5 | 0 | 0 | 6 | 5 | 0 | 0 | 8 | 5 | 0 | 2 | 0 | 5 | |
| 6 | 0 | 0 | 0 | 6 | 0 | 0 | 2 | 6 | 0 | 0 | 4 | 6 | 0 | 0 | 6 | 6 | 0 | 0 | 8 | 6 | 0 | 2 | 0 | 6 | |
| 7 | 0 | 0 | 0 | 7 | 0 | 0 | 2 | 7 | 0 | 0 | 4 | 7 | 0 | 0 | 6 | 7 | 0 | 0 | 8 | 7 | 0 | 2 | 0 | 7 | |
| 8 | 0 | 0 | 0 | 8 | 0 | 0 | 2 | 8 | 0 | 0 | 4 | 8 | 0 | 0 | 6 | 8 | 0 | 0 | 8 | 8 | 0 | 2 | 0 | 8 | |
| 9 | 0 | 0 | 1 | 9 | 0 | 0 | 3 | 9 | 0 | 0 | 5 | 9 | 0 | 0 | 7 | 9 | 0 | 1 | 9 | 9 | 0 | 2 | 1 | 9 | |

While the invention has been particularly shown and described with reference to a preferred embodiment, it will be understood by those skilled in the art that various changes in form and detail may be made therein without departing from the spirit and scope of the invention.

I claim:

1. An optical data storage media comprising:

a flat substrate patterned with a regular periodic pattern of lands and grooves, each land and groove having approximately equal widths;

information wobble marks added to said lands and grooves as deviations in a path of grooves to a first or second side by a fixed amount of identical magnitude for each wobble mark and for a short duration along the direction of said grooves;

grooves depths within said grooves;

wobble mark deflection distances along said grooves, wherein said groove depths and wobble mark deflection distances give detectable reflectivity signal amplitude from said wobble marks when sensed during playback, and give a sufficient position error signal when the defraction light distribution reflected from said grooves during playback is sensed by a conventional push/pull position error sensing system;

first and second wobble mark encodings, at least one of the wobble mark encodings designate a physical location of a selected length of groove or land, at wobble 5. The media according to claim 1, wherein the substrate is coated with a magnetic super resolution magneto optical recording film.

6. The media according to claim 1, wherein the groove depth is determined in order to minimize adjacent track interference of reflectivity marks from a phase change recording film.

7. The media according to claim 1, wherein the groove depth is determined in order to minimize adjacent track interference of reflectivity marks from an ablative write once film.

8. The media according to claim 1, wherein the groove depth is determined in order to minimize adjacent track interference of magnetic marks from magneto optical recording film.

9. The media according to claim 1, in which the wobble mark information is encoded by the presence (1) or absence (0) of the read back signal change in amplitude from wobble marks of variable lengths and at specific locations on the media.

10. The media according to claim 1, in which the wobble mark information is encoded by the center position of the read back signal from individual wobble marks relative to one another.

11. The media according to claim 1, in which the wobble mark information is encoded by the leading and trailing edges of the read back signal from the wobble marks relative to one another.

12. The media according to claim 1, wherein the first and second wobble mark encoding is to be used with a synchronous detection channel for decoding the sector address information.

13. The media according to claim 1, in which an N out of M code is used where M is greater than N and the read back detection is done by picking the code word that corresponds to the N largest amplitude signals at the read back wobble mark center positions for each code word.

14. The media according to claim 1, wherein the first and second wobble mark encoding is used with a synchronous detection channel for decoding the sector or track address information within a wobble mark pattern, which wobble mark pattern comprises:

a radially aligned wobble mark tone pattern for phase synchronizing a data channel clock to be aligned with the subsequent data wobble marks positions;

an address mark feature for determining which channel clock cycle is at the first bit position of the wobble mark data;

a sequence of synchronously decoded wobble marks that determine a unique sector address on the media.

15. The media according to claim 1, such that the synchronization, address mark and data information are encoded redundantly to allow sector address determination in the presence of media defects.

16. The media according to claim 1, wherein land and groove widths are approximately a laser full width half maximum diameter for a laser spot used during playback to sense features of said substrate.

17. The media according to claim 1, wherein the length of the wobble mark deflection along said groove is at least as long as a full-width half maximum for a laser used to read said marks during playback.

* * * * *